Figure 1:
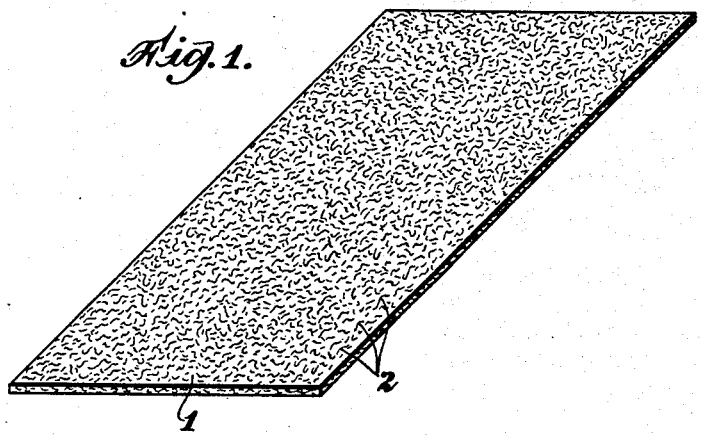

March 31, 1936.    J. C. MacILDOWIE    2,035,970
MOISTURE AND HEAT RESISTANT ARTICLE AND METHOD OF MAKING THE SAME
Filed April 24, 1933

INVENTOR
John C. MacIldowie.
BY D. N. Halstead
ATTORNEY

Patented Mar. 31, 1936

2,035,970

UNITED STATES PATENT OFFICE 2,035,970

MOISTURE AND HEAT RESISTANT ARTICLE AND METHOD OF MAKING THE SAME

John C. MacIldowie, Nashua, N. H., assignor to Johns-Manville Corporation, New York, N. Y., a corporation of New York Application April 24, 1933, Serial No. 667,679

10 Claims. (Cl. 91—70)

This invention relates to a moisture and heat resistant article and method of making the same, and particularly to a sheet adapted to support articles during baking.

It is conventional in certain baking operations, such as the baking of foundry cores, to support a wet, shaped mass upon a plate, insert the plate and object supported thereupon into a furnace, and bake at the desired temperature. After a selected period of baking, the sheet and article are removed and cooled. The plates commonly used consist of cast iron or steel. Such plates are very heavy, corrodible, and subject to breakage if allowed to fall, sometimes warp under the influence of heat, and, being excellent conductors of heat, may affect locally the temperature of that part of the supported core in contact with the sheet and cause the said part to have a temperature different from that of the remainder of the core.

It is an object of the present invention to overcome the disadvantages of plates conventionally used to support cores or other objects during baking. Other objects and advantages will appear from the following description and appended claims.

Briefly stated, the invention comprises an improved baking plate consisting essentially of a dense, hard sheet of heat resistant fibers and cementitious material, in prewarped and suitably surfaced condition. In a preferred embodiment, the invention comprises a prewarped and then planed sheet including asbestos and Portland cement and moisture and heat resistant sealing material, such as linseed oil, impregnated thereinto. The invention comprises also the method of making such a product which comprises impregnating suitable sealing material into a preformed, hard, dense sheet of the fibers and cement, subjecting the impregnated sheet to a baking temperature to establish the warp therein, abrading the warped sheet to form a plane surface or other desired contour of surface thereon, and repeating the impregnation, baking and abrading until there is produced a sheet of established shape, that is, essentially free from warpage at the temperature to which it is subjected during use.

Figure 2:
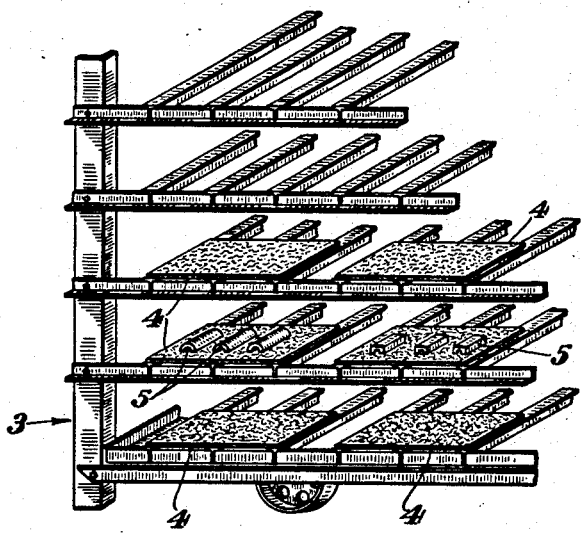

The invention is illustrated in the drawing in which:

Fig. 1 shows a perspective view of a baking plate of type that constitutes the preferred embodiment of the invention; and Fig. 2 shows a perspective view of a portion of a carriage suitable for introduction into a baking oven, with the improved baking plates in position on the carriage, and cores that are to be baked supported upon some of the baking plates.

The figures show a dense, heat resistant sheet comprising a heat resistant cementitious material 1, as, for example, Portland cement or a calcium aluminate (Lumnite) cement, heat resistant reenforcing fibers 2, of asbestos or the like, well distributed throughout the sheet, and sealing material.

Onto a carriage 3 of type conventionally used in foundry core ovens, there may be placed plates of the kind described, as illustrated at 4, and upon these plates objects 5 that are to be baked. These objects 5, in a preferred embodiment of the invention, are cores adapted for use (after being baked) in foundry casting but may be other suitable objects, as, for example, loaves of bread that are to be baked. The particular type of carriage, furnace, or arrangement of the plates upon supports or hearth may be varied, to use the equipment that is conventional in a given operation or industry. It is not considered necessary to illustrate such conventional equipment herein, other than to show an illustrative embodiment as in Fig. 2.

The method of making the improved product of the present invention is illustrated by the following specific example.

The base material for use in making the baking plates may be made, for example, by the well known process of forming a wet slurry of asbestos fibers and Portland cement in approximately equal weights, flowing the slurry in measured quantity, to form a layer, in a filtering bed plate of a hydraulic press, and then applying very strong compression, to remove by filtration most of the water and leave a strongly compressed and moist sheet of the fibers and cement. The sheet is then removed from the press and allowed to set until the cement therein is hardened. The product is a dense, hard, strong sheet.

The sheet so made is then impregnated and subjected to treatment to prewarp it.

Preferably, the sheet is first dried, as at 300° F. for 48 hours, and abraded, as by sanding, to remove the exterior surface, to increase the porosity of the surface and adapt it to more ready impregnation. The sheet, either after or without the said drying and/or abrading, is then impregnated with the moisture and heat resistant sealing material. As the sealing material, there may be used sodium silicate or a resinous material, suitably made fluent, in either case, by means of a volatile solvent which is evaporated subsequent to the impregnation. Thus, there may be used an aqueous solution of waterglass or a solution of a resin, such as glycerin phthalate of the type known as Glyptal, or a phenol aldehyde condensation product of the type known as bakelite, the resin being in a solution in a solvent such as a ketone and/or a hydrocarbon. The solubility of resins is known to those skilled in the art, and a satisfactory solvent for a given resin may be readily selected. A paint oil may be compounded with the resin. The preferred sealing material, however, is a drying or polymerizing oil such as boiled linseed oil. In some cases China-wood oil may be used as the major ingredient.

To make the impregnation, the sheet is suitably immersed in the impregnating composition in fluent form and the impregnating material forced into the sheet, advantageously under substantial pressure. The impregnated sheet is removed from the impregnating bath, excess liquid allowed to drain from the surface, the sheet then placed in the baking oven, and there subjected to an elevated temperature such as 350° F. When the original sheet is ¾ inches thick, for example, the impregnation in linseed oil may require approximately 3 hours and the baking, approximately 6 hours. During the baking treatment, the sheet undergoes warpage and the sealing material is hardened in situ, as by polymerization and/or oxidation of the paint oil type of sealing material or by the thorough dehydration of a sealing agent such as sodium silicate initially added in an aqueous composition.

The baked sheet is removed from the oven, allowed to cool, and abraded, as by a sanding machine, to give a surface of desired contour, say a flat or plane surface.

The abraded or planed material is then subjected to a second impregnation, say for ½ hour, and again baked, this time at a higher temperature than after the previous impregnation, as, for example, at approximately 500° F., to produce further warpage. The baked sheet is again abraded as before. The impregnation, baking, and sanding (abrading) operations are repeated until there is produced a sheet that shows no further appreciable warpage on being heated to the selected temperature or cooled therefrom. Suitably, the maximum temperature of baking during the manufacture of the sheet is approximately the same as that to which the sheet is to be subjected during use, provided, however, that the baking should be done only at a moderately elevated temperature, below the temperature which causes cracking or disintegration of the sheet.

Preferably, the sheet is subjected to one impregnation and baking operation after the permanent set is established and no further warpage is obtained, and the sheet, after the last baking, is abraded only slightly, by light sanding, to remove excess sealing material and leave on the finished sheet a surface that is relatively free from porosity and minor irregularities.

The sheets are cut to the exact size which is desired, suitably after the first baking and the edges formed by cutting are sealed by the subsequent oil treatments.

The amount of material which is polished or abraded away to remove the warpage introduced by baking, in the operations described above, may be approximately ¼ inch on a sheet that was initially ¾ inch thick. A typical finished sheet of approximately ½ inch thickness showed variations in elevations of the planed surface of not more than 1/64th inch in 24 inches of length or breadth.

The objects to be baked are illustrated by the cores 5 of Fig. 2, which are shaped articles consisting largely of sand and water which may contain a small proportion of conventional binder. When such moist objects are placed cold upon the baking plate, there is no substantial warpage of the plate, due to its impermeability to water. Also, when the plates and the objects supported thereupon are introduced into the baking furnace and baked, say to the approximate temperature that prevailed during the final baking step in the manufacture of the original plate, little warpage is produced. After the cores, for example, have been baked and the sheet and cores supported thereupon are removed from the oven and cooled, the cores are frequently given a so-called "core wash" with an aqueous composition. This wash is also without adverse effect upon the core plates.

It has been found that core wash, sand, and the like materials encountered in foundry practice do not adhere as badly to the improved core plates of the present invention as to cast iron or steel core plates. Also, the improved core plates are light in weight, non-corrodible, resistant to cracking when dropped, and show a lesser conductivity to heat, which minimizes unevenness of heating of the cores and permits handling of relatively hot plates by the workmen. The contour of the upper surface is such as to cause it to conform to the base of the object to be baked.

The improved plates of the present invention may be used for other purposes than those stated, as, for example, as match plates or bottom boards in foundries.

The details that have been given are for the purpose of illustration and not restriction. Variations therefrom may be made within the scope of the appended claims.

What I claim is:

1. A prewarped and planed sheet product, adapted to support cores in a baking furnace in foundry practice, comprising a dense, hard sheet of asbestos and Portland cement and a moisture and heat resistant sealing material including sodium silicate impregnated thereinto and baked in situ.

2. A prewarped and planed sheet product, adapted to support cores in a baking furnace in foundry practice without substantial warpage in said furnace, comprising a dense, hard sheet of asbestos and Portland cement and a moisture and heat resistant sealing material consisting of a linseed oil composition impregnated thereinto and baked in situ.

3. A prewarped and planed sheet product, adapted to support cores in a baking furnace in foundry practice, comprising a dense, hard sheet of asbestos and Portland cement and a moisture and heat resistant sealing material consisting of a resinous composition impregnated thereinto and baked in situ.

4. In making a plate adapted to support objects in a baking furnace at moderately elevated temperatures, the method which comprises impregnating linseed oil into a preformed, dry, hard, porous, heat resistant sheet consisting largely of asbestos and Portland cement, heating the impregnated sheet to establish the warp therein, and then cooling and abrading it to provide a plane surface thereon.

5. In making a plate adapted to support objects in a baking furnace at moderately elevated temperatures, the method which comprises impregnating a moisture and heat resistant sealing material into a preformed, dense, hard sheet of asbestos and Portland cement, heating the impregnated sheet to establish the warp therein, then cooling and abrading it to provide a surface of desired contour, and repeating the impregnating, heating, cooling, and abrading treatments until there is obtained no further substantial warpage on heating to a temperature of approximately 500° F.

6. In making a plate adapted to support foundry cores in a baking furnace at moderately elevated temperatures, the method which comprises impregnating a moisture and heat resistant sealing material into a preformed, dense, hard sheet of asbestos and Portland cement, heating the impregnated sheet to establish the warp therein, then cooling and abrading it to provide a plane surface thereon, repeating the impregnating, heating, cooling, and abrading treatments until there is obtained no further substantial warpage on heating to a temperature of approximately 500° F., and then subjecting the warp-free product to further treatment including an additional impregnation with the sealing material, to obliterate surface irregularities developed by the last abrading operation.

7. In the method described in claim 5, the heating of the impregnated article to a temperature approximately at least as high as that to which the finished product is to be exposed during use.

8. In the method described in claim 5, the heating of the impregnated article to a temperature which increases with each heating after an impregnation, as compared to the temperature of heating after a previous impregnation, the final heating being conducted at a temperature approximately at least as high as that to which the finished product is to be exposed during use.

9. In making a plate adapted to support objects in a baking furnace, at moderately elevated temperatures, the method which comprises forming a compressed and hardened sheet including asbestos and Portland cement, abrading a surface of the said sheet to increase the porosity of the surface and facilitate impregnation, impregnating into the abraded sheet a moisture and heat-resistant sealing material, heating the impregnated sheet to establish the warp therein and then cooling and abrading the warped product to provide a surface of desired contour.

10. A dense hard sheet, for supporting objects in a baking furnace, including asbestos and a cementitious material selected from a group consisting of Portland cement and a calcium aluminate cement and a moisture and heat-resistant sealing material incorporated thereinto, the sheet being in the condition of having been baked at an elevated temperature to establish permanently the temperature warpage thereof and then abraded to produce a substantially plane surface.

JOHN C. MacILDOWIE.